United States Patent [19]
Currie

[11] Patent Number: 5,495,400
[45] Date of Patent: Feb. 27, 1996

[54] OPTICAL FIBER ILLUMINATION DEVICE

[76] Inventor: Joseph E. Currie, R.F.D. 8 17 Lawrence Rd., Hudson, N.H. 03051

[21] Appl. No.: 394,269

[22] Filed: Feb. 24, 1995

Related U.S. Application Data

[63] Continuation-in-part of Ser. No. 132,341, Oct. 6, 1993, Pat. No. 5,400,225.

[51] Int. Cl.⁶ .............................. B60Q 1/00; B60Q 1/26; F21V 8/00
[52] U.S. Cl. .................. 362/32; 362/61; 362/80; 340/479; 340/468; 340/475
[58] Field of Search ................ 362/61, 80, 237, 362/32, 83.3, 223, 311, 374, 375, 455, 74, 329, 330; 340/479, 475, 473, 468, 470

[56] References Cited

U.S. PATENT DOCUMENTS

| | | | |
|---|---|---|---|
| 3,578,973 | 5/1971 | Dooley | 362/32 X |
| 3,761,706 | 7/1973 | Frey | 362/32 |
| 4,758,931 | 7/1988 | Gabalden | 340/479 X |
| 4,808,968 | 2/1989 | Caine | 340/479 |
| 4,896,136 | 1/1990 | Hotovy | 362/80.1 |
| 4,935,722 | 6/1990 | Pollack | 340/479 |
| 4,947,293 | 8/1990 | Johnson et al. | 362/32 |
| 4,977,487 | 12/1990 | Okano | 362/32 |
| 4,996,632 | 2/1991 | Aikens | 362/32 |
| 5,010,319 | 4/1991 | Killinger | 340/472 |
| 5,031,078 | 7/1991 | Bornhurst | 362/32 |
| 5,111,183 | 5/1992 | Wang | 340/479 |
| 5,122,933 | 6/1992 | Johnson | 362/32 |
| 5,150,961 | 9/1992 | Gonzalez | 362/32 X |
| 5,181,773 | 1/1993 | Colvin | 362/32 X |
| 5,193,893 | 5/1993 | Mitko | 362/32 |

*Primary Examiner*—Ira S. Lazarus
*Assistant Examiner*—Thomas M. Sember
*Attorney, Agent, or Firm*—Richard C. Litman

[57] ABSTRACT

An optical fiber illumination device including at least one optical fiber cable, one or more light sources for introducing light into the optical fiber cable, a lens through which light from each light source passes prior to entering the optical fiber cable for producing a colored light, electrical circuitry for energizing the light source, and a housing for containing the circuitry and the light source. A first light source is energized by a first power source. Light emitted from the first light source passes through a first lens which possesses a desired filtering characteristic. Upon application of the second power source, a first control device disables the first light source. Moreover, the second power source may energize a second light source which passes through a second lens having a filtering characteristic distinct from that of the first lens. Upon application of a third power source, a second control device disables the first control device. The device can be used to illuminate auto body parts, such as the sides of pickup and flat-bed trucks, or the rear of semi-tractor trailers. The device operates in cooperation with the brake lights, the parking lights, and the turn signals of a motor vehicle to increase the visibility of the vehicle.

20 Claims, 13 Drawing Sheets

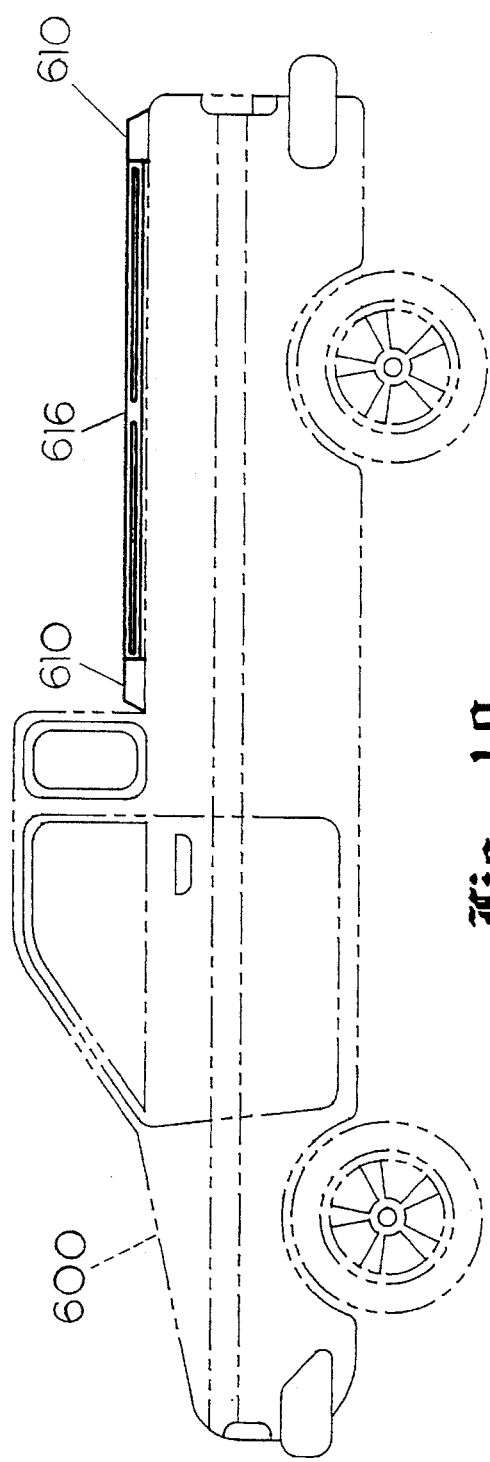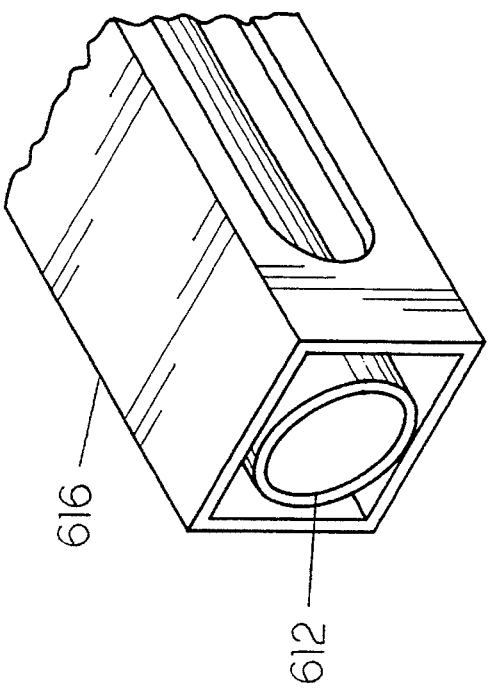

OPTICAL FIBER ILLUMINATION DEVICE

This application is a Continuation-in-Part of Ser. No. 08/132,341, filed Oct. 6, 1993, now U.S Pat. No. 5,400,225.

BACKGROUND OF THE INVENTION

1. Field of the Invention

The present invention relates to an optical fiber illumination device and, more particularly, to an optical fiber illumination device for use with a motor vehicle.

2. Description of the Prior Art

An increased emphasis on motor vehicle safety and reliability has presented the need for a clear, distinct, and brighter motor vehicle lighting system to improve the motor vehicle operator's awareness of the presence of surrounding motor vehicles, thereby reducing the risk of costly personal injury and property damage attributable to motor vehicle collisions.

Several attempts have been proposed to address this need. One such attempt is shown in U.S. Pat. No. 5,150,961, issued Sep. 29, 1992, to Jaime D. Gonzalez, which discloses an apparatus for illuminating a motor vehicle license plate. The apparatus includes an annular license plate cover having a channel therein for receiving an annular-shaped neon tube and a high-voltage, high-frequency transformer. The annular-shaped neon tube is connected to the high-voltage, high-frequency transformer, which is connected to the motor vehicle electrical system through a low-voltage, high-frequency power supply. Upon application of the motor vehicle brakes, the neon tube is energized. Though this neon tube emits a brilliant light, it may prove to be less effective than a center-high mounted brake light (i.e. a brake light disposed approximately eye level with trailing motor vehicle operators) in alerting trailing motorists.

Center-high mounted brake lights are well known. In fact, modern legislation or current federal regulations require motor vehicles to possess a center-high mounted brake light in addition to standard brake lights. The center-high mounted brake light is intended to maximize or greatly enhance the visibility of a braking motor vehicle for motor vehicle operators trailing therebehind.

Generally, center-high mounted brake lights employ a standard lenticular lens and an incandescent lamp enclosed within a housing that is mounted in the motor vehicle rear window on the motor vehicle rear packaging shelf or dash board. An example of a center-high mounted brake light is shown in U.S. Pat. No. 5,111,183, issued May 5, 1992, to Frank Wang. Wang discloses an optical fiber brake lamp including a housing for accommodating a lamp, a focusing lens, and a color board. The lamp is preferably a halogen lamp as opposed to an incandescent lamp. The color board may be a single-color board or a rotatably driven, multi-color board. The color board thoroughly covers the focusing lens. Upon application of the motor vehicle brakes, the halogen lamp emits light through the color board, the focusing lens, and further through a bundle of end-light optical fibers. The end-light optical fibers terminate in a display panel. The single-color board provides a single-color display and the multi-color board provides a multi-color display.

A significant problem associated with center-high mounted brake lights is that the housing typically obscures some portion of the rearward vision of the motor vehicle operator. U.S. Pat. No. 4,935,722, issued Jun. 19, 1990, to Slava A. Pollack, attempts to address this issue. Pollack discloses a transparent center-high brake light for motor vehicles. The brake light includes a crystal in the form of a transparent plate or optical fiber applied to a motor vehicle rear window, and an infrared energy source located at a remote location within the motor vehicle. The crystal, when illuminated by the infrared energy source, produces a visible light.

To further address the issue of obscuring the rearward vision of a motor vehicle operator, center-high mounted brake lights have also been mounted in motor vehicle body parts, such as in rear decks, spoilers, and roofs. An example of mounting an illumination device which is a motor vehicle body part is shown in U.S. Pat. No. 4,947,293, issued Aug. 7, 1990, to Glenn M. Johnson et al. Johnson et al. disclose a semi-trailer cargo vehicle perimeter clearance lighting system including light guides recessed in an indentation adjacent the roof of the semi-trailer cargo vehicle container body. The light guide is secured by clips and terminates in a cap. The light guide is configured to produce light flux propagation along its length as well as to emit light laterally. The light guides originate from an enclosure having a removable cover. The enclosure contains a light source and a concave surface. The concave surface focuses light flux from the light source into the end of the light guide opposite its terminal end. To some degree, mounting the illumination device in a motor vehicle body part addresses the obscurity of rearward vision. However, the placement of the illumination device in the motor vehicle body parts may be somewhat complex and may impose structural limitations on the motor vehicle design.

In addition to the aforementioned patents, other patents which are deemed of interest are as follows. U.S. Pat. No. 4,996,632, issued Feb. 26, 1991, to Wallace R. Aikens, discloses a multi-color illuminating system including an elongated light source disposed within an inner tube having a diffusion medium and a light-transmitting opening opposite the diffusion medium. The inner tube, in turn, is disposed within an outer tube having light-transmissive portions of differing colors. Light from the light source is reflected from the reflective film through the diffusion medium and the light-transmitting opening of the inner tube, and further through the light-transmissive opening of the outer tube against a sign or like object. To select a desired color for illumination, the outer tube is rotatable relative to the inner tube by a motor.

A motor vehicle warning light device is disclosed in U.S. Pat. No. 5,010,319, issued Apr. 23, 1991, to Erich Killinger. This reference discloses a warning light device including an optical fiber display which is mounted to a motor vehicle rear roof and operable from the proximity of the motor vehicle operator. The warning light device is connected to the motor vehicle electrical system. A plurality of optical fiber bundles can be illuminated through individually triggered light sources and/or color filters.

U.S. Pat. No. 5,193,893, issued Mar. 16, 1993, to Michael A. Mitko, discloses a motor vehicle hood deflector which supports a sign. End-light optical fiber cables supply light to the sign from the motor vehicle head lamps.

A significant problem remains in that center-high mounted brake lights are costly, are not aesthetically pleasing, and, for the most part, remain to block the motor vehicle operator's view. Size, location, aesthetic appearance, and cooperation with existing motor vehicle structure and design all need to be considered in devising a center-high mounted brake light. Visibility is especially critical in adverse weather conditions, such as in fog, rain, and snow.

It is desirable to present an illumination device for illuminating a motor vehicle which is relatively inexpensive and easy to install, highly visible, and which minimizes the obstruction of the motor vehicle operator's rearward view.

None of the above references, taken alone, or in any combination, is seen to describe the present invention.

SUMMARY OF THE INVENTION

The present invention is an optical fiber illumination device and, more particularly, an optical fiber illumination device for use with a motor vehicle. The optical fiber illumination device includes at least one optical fiber cable adapted to cooperate with existing motor vehicle body parts, one or more light sources for introducing light into the optical fiber cable, a lens through which light from the light source passes prior to entering the optical fiber cable for producing a colored light, electrical circuitry for energizing the light source, and a housing for containing the circuitry and the light source.

The fiber optical cable is preferably mountable about the periphery of the motor vehicle rear window, minimizing the obstruction of the motor vehicle operator's rearward vision. An optical fiber cable disposed about the periphery of the motor vehicle rear window is arranged over a large area and approximately at eye level so as to be highly visible to trailing motor vehicle operators. This provides a clear, distinct and brighter motor vehicle lighting system and increases the motor vehicle safety and improves the awareness of the motor vehicle operator which, in turn, reduces the risk of property damage and personal injury caused by motor vehicles.

Preferably, a red lens is provided and upon application of the motor vehicle brakes, a light source is energized which passes through the red lens to produce a red light which, in turn, enters into and is emitted from the optical fiber cable. Such a configuration would provide a highly visible emission of red light about the periphery of the motor vehicle rear window which would correspond to the red motor vehicle brake lights. This provides a supplemental warning indicator of braking motor vehicles for trailing motor vehicle operators.

A light source may be energized independent of the motor vehicle brake lights and may pass through an alternative lens of a color other than red, for example, an amber colored lens. Light from the light passing through the amber lens emits an amber colored light from the optical fiber cable, providing greater visibility of the motor vehicle for trailing motor vehicle operators. It is preferable that the light source passing through the amber colored lens be overridden by the light source passing through the red colored lens to permit the emission of a red colored light upon the application of the motor vehicle brakes so as to increase awareness of a braking motor vehicle.

The alternative colored lens may be operable in conjunction with the motor vehicle parking lights and/or the motor vehicle directional or turn signal lights. For example, the alternative light source may be energized upon energizing the parking lights and may be provided with a supplemental control device to energize and deenergize the alternative light source while the parking lights remain energized. Moreover, the alternative light source may be interrupted upon application of the right and left turn signals as well as the hazard flasher. For instance, the alternative light source may be deenergized when a directional lamp is illuminated, and may be energized when the directional lamp flashes off, thus producing an alternating flashing effect between the optical fiber cable and the directional lights. Alternatively, the optical fiber cable could illuminate simultaneously with the motor vehicle turn signals. Either configuration would emphasize to a trailing motor vehicle operator that a leading motor vehicle operator intends to turn. In either embodiment, the application of the motor vehicle brakes could either disable the alternative light source or alternatively energize and deenergize the alternative light source as the brake lights flash off and on, providing a highly visible indicator of both brake and directional lights.

The optical fiber illumination device is not limited in its application to the aforementioned embodiments, but may be employed to illuminate motor vehicle body parts, such as wheels or wheel coverings. In the former embodiments, side-light optical fiber cables would be employed. In the later embodiments, end-light optical fiber cables wold be employed. Similar to that of the former embodiments, the later embodiment would also become energized or deenergized depending upon application of the motor vehicle brakes, directional signals, parking and/or running lights, and headlights.

The housing of either one of the optical fiber illumination devices according to the present invention may be located in a convenient location, such as in the motor vehicle trunk or hood compartment. The mounting of the housing in an inconspicuous location provides an aesthetically appealing optical fiber illumination device which further minimizes obstruction of the motor vehicle operator's rearward vision.

The optical fiber illumination device may be retrofit on existing motor vehicles. The optical fiber illumination device cooperates with existing motor vehicle body parts and may be easily installed with little or no modification to the existing motor vehicle body.

Accordingly, it is a principal object of the invention to provide an optical fiber illumination device adapted to cooperate with existing motor vehicle body parts.

It is another object that a fiber optical cable be mountable about the periphery of the motor vehicle rear window to minimize obstruction of the motor vehicle operator's rearward vision.

It is a further object that the optical fiber cable be arranged over a large area and approximately at eye level so as to be highly visible to operators of trailing motor vehicle and provide a clear, distinct and brighter motor vehicle lighting system.

Another object is that a red lens be provided, whereupon application of the motor vehicle brakes, a light source is energized which passes through the red lens to produce a highly visible emission of red light about the periphery of the motor vehicle rear window which would correspond to the red motor vehicle brake lights.

Another object is that a light source be energized independent of the motor vehicle brake lights and that light from such a light source pass through an alternatively colored lens, whereupon light passing through the alternatively colored lens emits an alternative colored light from the optical fiber cable, providing greater visibility of the motor vehicle for trailing motor vehicle operators.

Yet another object is that the alternative colored light source be overridden by the light source passing through the red colored lens to permit the emission of a red colored light upon the application of the motor vehicle brakes so as to increase awareness of a braking motor vehicle.

Another object is that the alternative colored light source may be operable in conjunction with the motor vehicle parking lights and/or the motor vehicle directional or turn signal lights, whereupon the alternative light source may be energized upon energizing the parking lights.

Another object is that the alternative colored light source may be interrupted upon application of the right and left turn signals as well as the hazard flasher and upon application of the motor vehicle brakes, providing a highly visible indicator of both brake and directional lights.

Another object is that the optical fiber illumination device be employed to illuminate motor vehicle body parts.

Another object is that the optical fiber illumination device be aesthetically appealing and minimize obstruction of the motor vehicle operator's rearward vision.

Still another object is that the optical fiber illumination device may be retrofit on existing motor vehicles, cooperate with existing motor vehicle body parts, and be easily installed with little or no modification to existing motor vehicle body parts.

It is an object of the invention to provide improved elements and arrangements thereof in an apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

FIG. 19 is a left-side elevational view showing another embodiment of the invention installed along the bed of a pickup truck.

FIG. 20 is a magnified perspective view of the embodiment shown in FIG. 19, showing a detailed view of the means for mounting the fiber optic cable to a motor vehicle.

Where possible, similar reference characters denote corresponding features throughout the attached drawings.

DETAILED DESCRIPTION OF THE PREFERRED EMBODIMENTS

Figure 1:
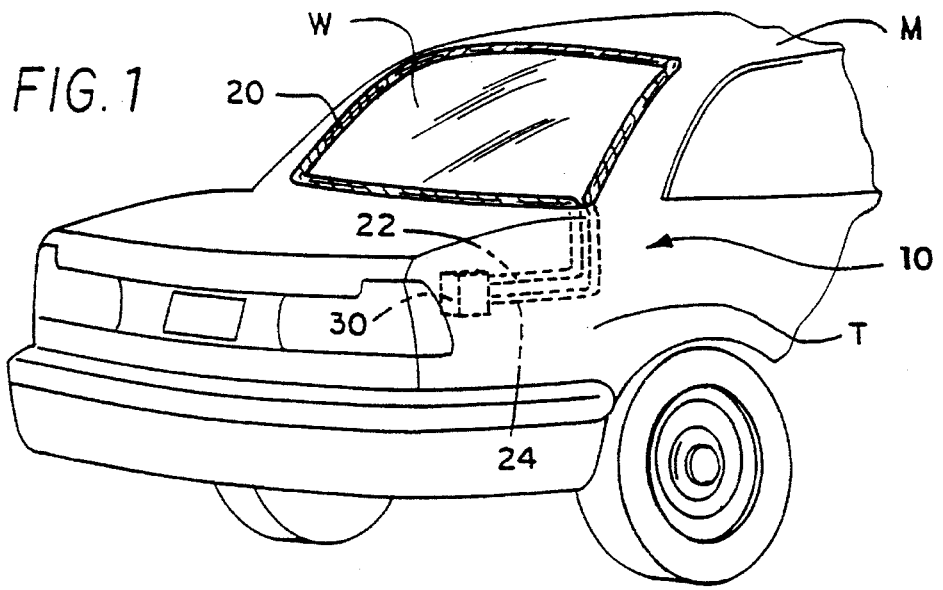
FIG. 1 is an environmental view of a light fiber illumination device according to the present invention.

The present invention is a light fiber illumination device 10 for use with a motor vehicle M. As shown in FIG. 1, the illumination device 10 includes a light fiber or a round optical fiber side-light cable 20 which forms a continuous loop about the periphery of the motor vehicle rear window W. The optical fiber cable 20 has two input ends 22, 24. Each one of the ends 22, 24 terminates in a control box or light source box 30 located in a motor vehicle storage area, such as the trunk compartment T. The light source box 30 would be provided with a removable closure or cover (not shown) to protect the contents therein from exposure when secured thereto and to offer access to the contents therein when removed therefrom.

Figure 2:
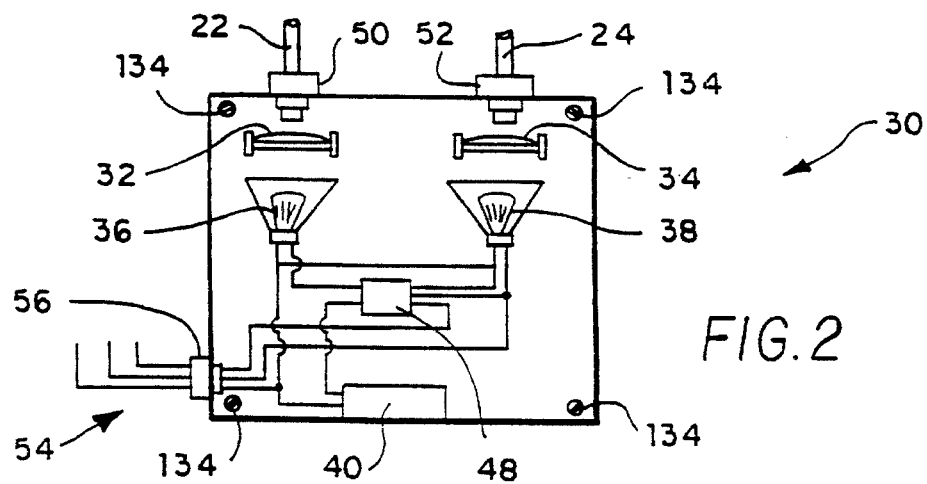
FIG. 2 is a front elevation of a light source box of the light fiber illumination device.

As shown in FIG. 2, the light source box 30 contains two lenses 32, 34, two 12 volt halogen lamps 36, 38, a ventilation fan 40, and two normally closed (N/C) switches 42, 44 (shown in FIG. 3), a normally open (N/O) switch 46 (also shown in FIG. 3), and a relay 48.

Each one of the halogen lamps 36, 38 is arranged to emit light through a respective one of the lenses 32, 34. Each one of the optical fiber cable ends 22, 24 terminates adjacent a respective one of the lenses 32, 34. The relay 48 physically controls the operation of the switches 42, 44, 46 (shown in FIG. 3) which, in turn, control the operation of each one of the halogen lamps 36, 38. The ventilation fan 40 supplies ambient air internally of the light source box 30 to maintain the device 10 at a suitable operating temperature.

Figure 3:
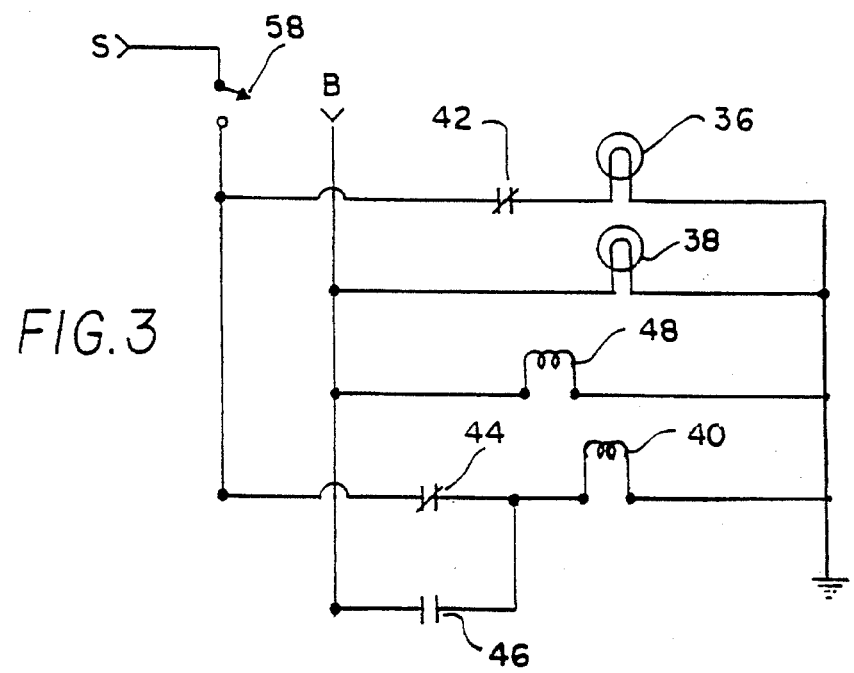
FIG. 3 is a schematic representation of a circuit configuration of a light fiber illumination device according to a first embodiment of the present invention.

A circuit configuration according to a first embodiment of the present invention is shown in FIG. 3. In this embodiment, a first one of the halogen lamps 36 and the ventilation fan 40 are connected parallel to one another and in parallel with the motor vehicle parking light circuit S through N/C switches 42, 44. A toggle switch 58 facilitates as a secondary control for the first halogen lamp 36 and the ventilation fan 40. The first halogen lamp 36 is energized and the ventilation fan 40 is actuated only when both the parking light circuit P is energized and the toggle switch 58 is closed.

A second one of the halogen lamps 38, the ventilation fan 40, and the relay 48 are connected in parallel with one another and in parallel with the motor vehicle brake light circuit B. The ventilation fan 40 is connected in parallel with the motor vehicle brake light circuit B through the N/O switch 46. Upon application of the motor vehicle brakes, the motor vehicle brake light circuit B is energized which, in turn, energizes the relay 48 to open the N/C switches 42, 44 and to close the N/O switch 46, thereby deenergizing the first halogen lamp 36 and energizing the second halogen lamp 38, while continuing the operation of the ventilation fan 40. Upon release of the motor vehicle brakes, the relay 48 is deenergized so as to permit the switches 42, 44, 46 to return to their respective normally closed and opened positions, and the first halogen lamp 36 again becomes energized and the second halogen lamp 38 becomes deenergized. The ventilation fan 40 is energized under both conditions, that is, whether the first or second halogen lamp 36, 38 is illuminated.

By switching the toggle switch 58 to an opened position, the first halogen lamp 36 and the ventilation fan 40 become deenergized. Even with this portion of the circuit deenergized, an application of the motor vehicle brakes energizes both the second halogen lamp 38 and the ventilation fan 40.

Referring to FIG. 2, upon energizing the first halogen lamp 36, light passes through a first one of the lenses 32 into the optical fiber cable first end 22, and further through the optical fiber cable 20 (shown more clearly in FIG. 1). The first lens 32 is preferably a colored lens of a color other than red. As the light passes through the optical fiber cable 20, light of the color of that lens 32 is emitted from the optical fiber cable 20 so as to be visible from without the motor vehicle M.

Upon energizing the second halogen lamp 38, the first halogen lamp 36 is deenergized and light passes through a second one of the lenses 34 into the optical fiber cable second end 24, and further through the optical fiber cable 20 (shown more clearly in FIG. 1). The second lens 34 is preferably red in color. As the light passes through the optical fiber cable 20, a red light is emitted from the optical fiber cable 20 so as to be visible from without the motor vehicle M.

Figure 4:
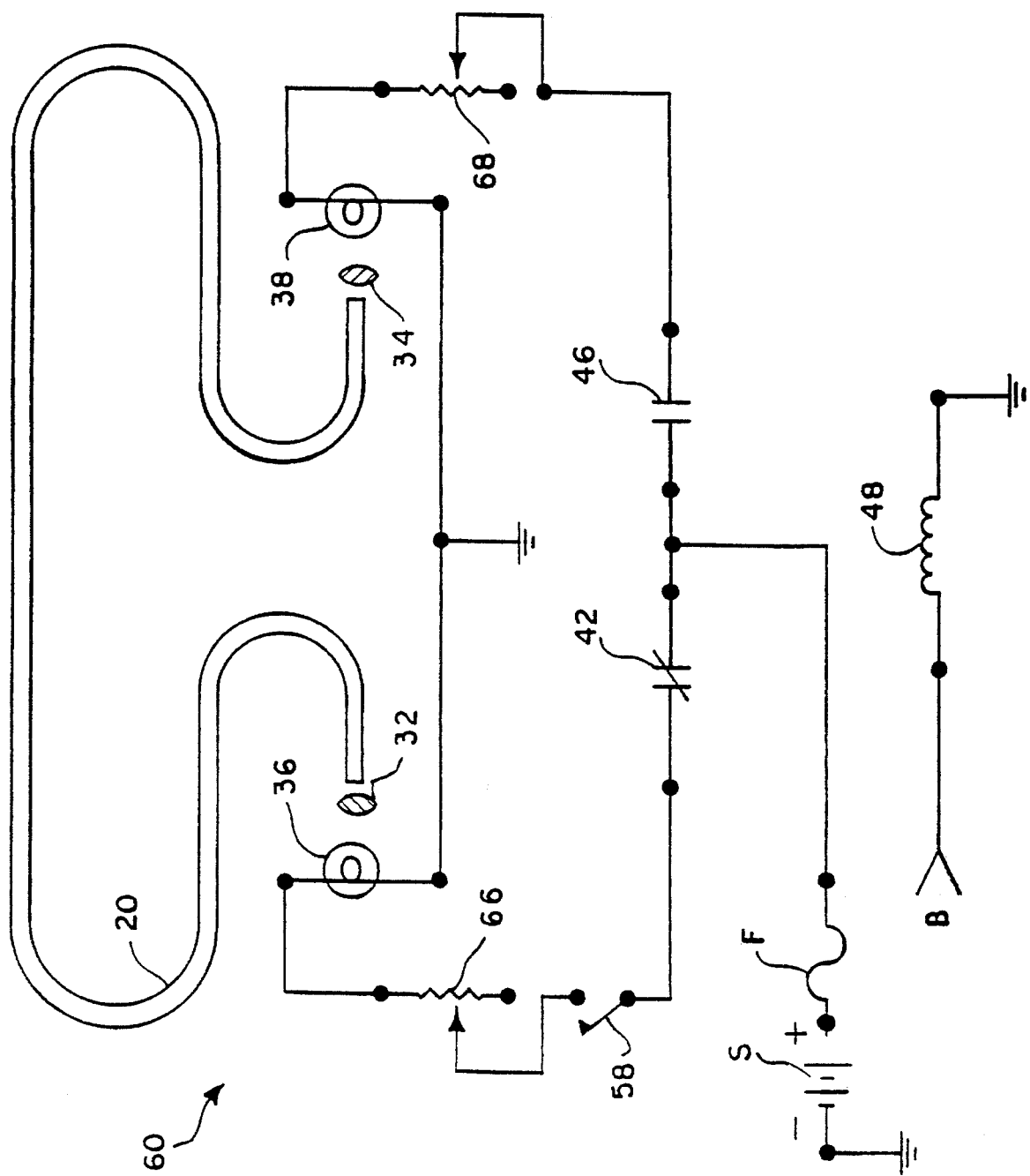
FIG. 4 is a schematic representation of a circuit configuration according to a second embodiment of the light fiber illumination device.

FIG. 4 shows a circuit configuration according to a second embodiment of the light fiber illumination device 60. In this embodiment, first and second halogen lamps 36, 38 are connected in parallel with one another and in series with a 12 volt source S through a circuit protection device F. The first halogen lamp 36 is connected in series with the 12 volt source through a N/C switch 42. The second halogen lamp 38 is connected in series with the 12 volt source S through a N/O switch 46.

Similar to that of the first embodiment 10 mentioned above, a toggle switch 58 is connected in series with the first halogen lamp 36 to control the operation of the first halogen lamp 36. The second halogen lamp 38 is energized upon the application of the motor vehicle brakes. When the motor vehicle brakes are applied, the first halogen lamp 36 is disabled through the actuation of the relay 48 which opens the N/C switch 42. As the N/C switch 42 is opened, the relay 48 simultaneously closes the N/O switch 46 to energize the second halogen lamp 38. In order for the first halogen lamp 36 to be illuminated, the toggle switch 58 must be closed. However, whether the toggle switch 58 is opened or closed, the application of the motor vehicle brakes energizes the second halogen lamp 38.

Unlike the first embodiment 10, the second embodiment 60 includes two variable resistors or potentiometers 66, 68 for varying the degree of illumination of each of the halogen lamps 36, 38. A first one of the potentiometers 66 is connected in series with the first halogen lamp 36 and a second one of the potentiometers 68 is connected in series with the second halogen lamp 38. In this way, the degree of illumination of each of the halogen lamps 36, 38 may be varied independently of the other and hence, the amount of light being emitted from each halogen lamp 36, 38 through the optical fiber cable 20 is independently variable.

Figure 5:
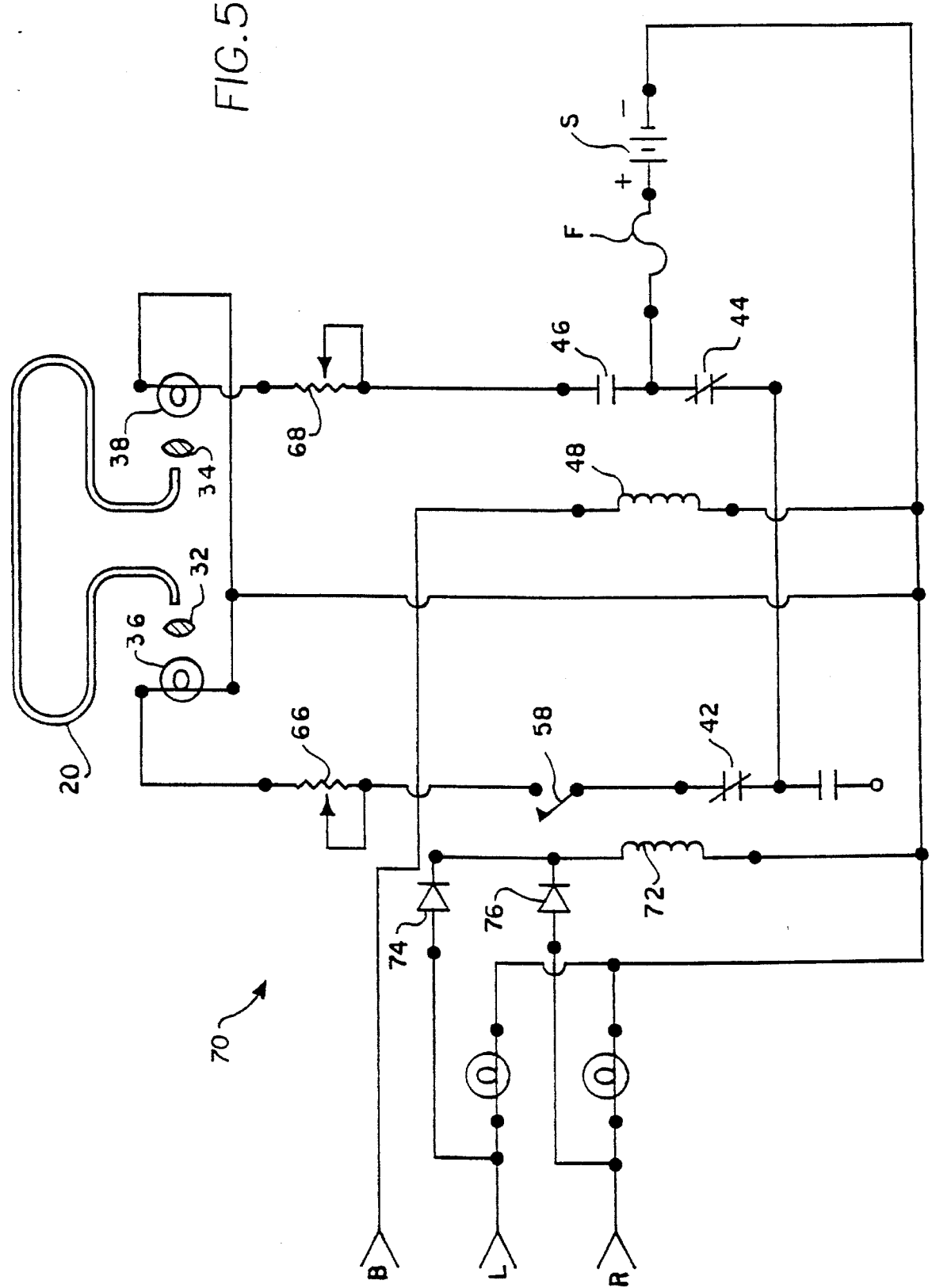
FIG. 5 is a schematic representation of a circuit configuration according to a third embodiment of the light fiber illumination device.

A circuit configuration according to a third embodiment of the light fiber illumination device 70 is shown in FIG. 5. First and second 12 volt halogen lamps 36, 38 are each connected in parallel with one another and in series with a circuit protection device F and a 12 volt source S. The first halogen lamp 36 is further connected in series with a first potentiometer 66, a toggle switch 58, a first N/C switch 42, and a second N/C switch 44. The second halogen lamp 38 is further connected in series with a second potentiometer 68 and a N/O switch 46. A first relay 48 is connected in parallel with the brake light circuit B. A second relay 72 is connected in parallel with both the right and left directional or turn signal circuits R, L respectively through first and second diodes 74, 76.

In operation, the first halogen lamp 36 is energized by closing the toggle switch 58 which permits current to flow from the 12 volt source S through the circuit protection device F, both N/C switches 42, 44, the first potentiometer 66, and the first halogen lamp 36. The intensity of the first halogen lamp 36 may be varied by varying the resistance offered by the first potentiometer 66, thereby varying the light intensity flowing through the first lens 32 which, in turn, varies the light being emitted from the optical fiber cable 20.

The application of the motor vehicle brakes energizes the first relay 48 to open the first N/C switch 42 and to close the N/O switch 46. This deenergizes the first halogen lamp 36 and energizes the second halogen lamp 38. The intensity of the second halogen lamp 38 may likewise be varied by varying the resistance offered by the second potentiometer 68, thereby varying the light intensity flowing through the second lens 34 which, in turn, varies the light being emitted from the optical fiber cable 20. Similar to that of the first two embodiments 10, 60, the second lens 34 of the third embodiment is preferably red in color.

In addition to the first halogen lamp 36 being disabled by the application of the motor vehicle brakes, it is disabled through the application of either the left or the right turn signal. Upon applying either the left or right turn signal, the second relay 72 is actuated for a period of time in which each of the left or right turn signals are energized. The actuation of the second relay 72 opens the second N/C switch 44 to deenergize the first halogen lamp 36. Hence, as the motor vehicle turn signals flash on, the first halogen lamp 36 flashes off, and as the motor vehicle turn signals flash off, the first halogen lamp 36 flashes on. An application of the motor vehicle brakes disables the first halogen lamp 36 altogether.

The two diodes 74, 76 isolate the left and right turn signal circuits L, R from one another. The second diode 76 blocks current flow from the left turn signal circuit L to the right turn signal circuit R, and the first diode 74 blocks current flow from the right turn signal circuit R to the left turn signal circuit L, thereby preventing the right turn signal lamps from being energized upon energizing the left turn signals, and vice versa.

Figure 6:
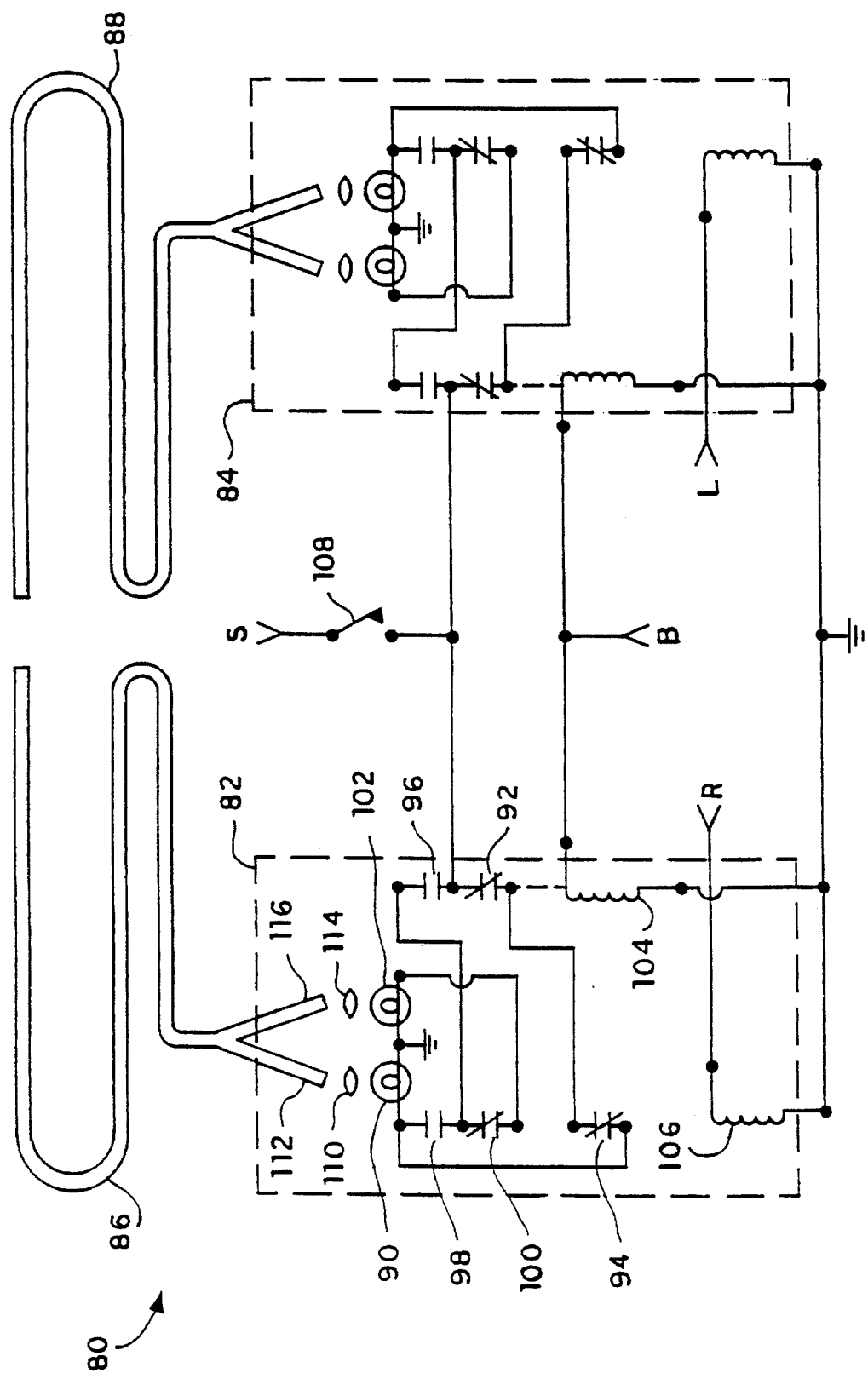
FIG. 6 is a schematic representation of a circuit configuration according to a fourth embodiment of the light fiber illumination device.

FIG. 6 shows a circuit configuration according to a fourth embodiment of the light fiber illumination device 80. Two separate and independent circuits 82, 84 and two optical fiber cables 86, 88 are included in this embodiment 80.

A first one of the circuits or a right circuit 82 is operable to transmit light through a first one of the optical fiber cables or a right optical fiber cable 86. The light enters into a first end of the optical fiber cable 86 and a second end of the optical fiber cable is sealed or capped off to prevent light from escaping therefrom. This circuit 82 includes a first branch having a first 12 volt halogen lamp 90 connected in series with a first N/C switch 92 and second N/C switch 94. A second branch is connected in parallel with the first branch and includes a first N/O switch 96 connected in series with a second N/O switch 98 and in parallel with a third N/C switch 100. The second N/O switch 98 is connected in series with the first halogen lamp 90. In addition, the third N/C switch 100 is connected in series with a second 12 volt halogen lamp 102. The circuit 82 further includes a first relay 104 connected in parallel with the motor vehicle brake light circuit B and a second relay 106 connected in parallel with the motor vehicle right directional or turn signal circuit R. A 12 volt source S and a toggle switch 108 are connected in series with both branches of the circuit 82.

In operation, upon closing the toggle switch 108, the first branch of the first circuit is energized. Current flows through the first and second N/C switches 92, 94 to illuminate the first halogen lamp 90. Light emitted from the first halogen lamp 90 passes through a first lens 110 into a first branch 112 of the first optical fiber cable 86 and further through the first optical fiber cable 86. The color of the light emitted from the first optical fiber cable 86 is determined by the color of the first lens 110. The color of the first lens 110 may be any number of desired colors but is preferably not of the color red.

Upon application of the motor vehicle brakes, the first branch is deenergized and the second branch is energized. This is accomplished by energizing the first relay 104. The first relay 104 is energized by the motor vehicle brake light circuit B to open the first N/C switch 92 and close the first N/O switch 96. Current flows through the first N/O switch 96 and the third N/C switch 100. This disables the first halogen lamp 90 and energizes the second halogen lamp 102. Light emitted from the second halogen lamp 102 passes through a second lens 114 into a second branch 116 of the first optical fiber cable 86 and further through the first optical cable 86. The second lens 114 is preferably red in color so as to emit red light through the first optical cable 86 upon application of the motor vehicle brakes.

Upon application of the motor vehicle right turn signal, the first branch of the first circuit 82 is disabled. This is accomplished by energizing the second relay 106. The second relay 106 is energized by the motor vehicle right turn signal circuit R to open the second and third N/C switches 94, 100, and close the second N/O switch 98. The first halogen lamp 90 is deenergized upon the illumination of the right turn signal and is energized when the right turn signal flashes off.

Upon application of both the motor vehicle brakes and the right turn signal, the first halogen lamp 90 is energized and the second halogen lamp 102 is disabled upon the illumination of the right turn signal and when the right turn signal flashes off, the first halogen lamp 90 is disabled and the second halogen lamp 102 is energized. This configuration permits the first optical fiber cable 86 to emit light from the first halogen lamp 90 upon closing the toggle switch 108, to emit light from the second halogen lamp 102 upon applying the motor vehicle brakes, to inhibit the emission of light when the right turn signal is applied, and to alternatively emit light from the first and second halogen lamps 90, 102 when both the motor vehicle brakes and right turn signal are applied.

A second one of the circuits or a left circuit 84 is operable to transmit light through a second one of the optical fiber cables or a left optical fiber cable 88. The second circuit 84 is similar in configuration and operation to that of the first circuit 82, as described above. Hence, to simplify the specification, a description of the second circuit 84 is omitted.

Figure 7A:
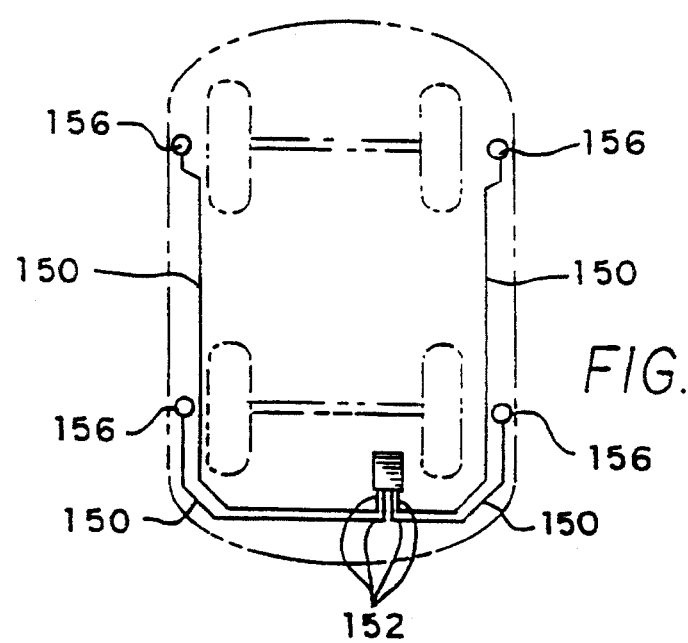
FIG. 7A is a schematic representation of a fifth embodiment of the light fiber illumination device.
Figure 7C:
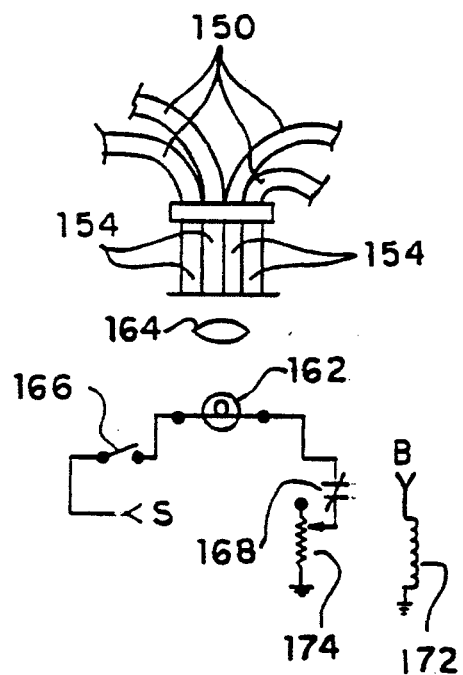
FIG. 7C is a schematic representation of a circuit configuration according to the fifth embodiment of the light fiber illumination device.
Figure 7B:
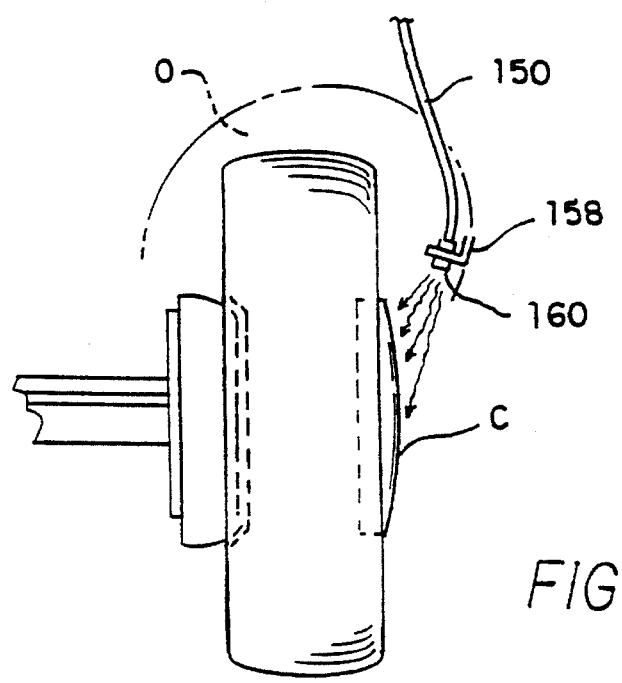
FIG. 7B is a diagrammatic representation of a motor vehicle wheel well having a light fiber illumination device installed therein.

A fifth embodiment of the present invention is shown in FIGS. 7A, 7B and 7C. Four end-light optical fiber cables 150 are included in this embodiment. A first end 152 of each of the four optical fiber cables 150 is bundled and the bundle terminates in the light source box 154. A second end 156 of each of the optical fiber cable 150 terminates at a respective one of the motor vehicle wheel well openings O. A holding bracket 158 and a diffusion lens 160 are positioned in each one of the motor vehicle wheel well openings O, such as is shown in FIG. 7B. Each of the optical fiber cable second ends 156 terminates adjacent a respective diffusion lens 160 to provide maximum illumination for each of the motor vehicle wheels or wheel coverings C. As shown in FIG. 7C, this embodiment requires a single 12 volt halogen lamp 162 and accompanying lens 164. The halogen lamp 162 is connected in series with a toggle switch 166, a N/C switch 168, and a 12 volt source S. A relay 172 is provided which is connected in parallel with the motor vehicle brake light circuit B which opens the N/C switch 168 upon application of the motor vehicle brakes, thereby ceasing the illumination of the wheel covers C. Similar to that of an aforementioned embodiment, a potentiometer 174 may be provided to vary the illumination of the wheel coverings C.

Additionally, the optical fiber illumination device as shown in FIG. 7A may be designed to steadily illuminate the wheels with one hue of light during normal operation, i.e. without the directional signals or the brake lights activated, and to blink on and off in when the directional signals and/or brake light circuits are activated. In this embodiment, the wheel illumination would function in the same fashion as that described above for the side-light optical cable.

Figure 8:
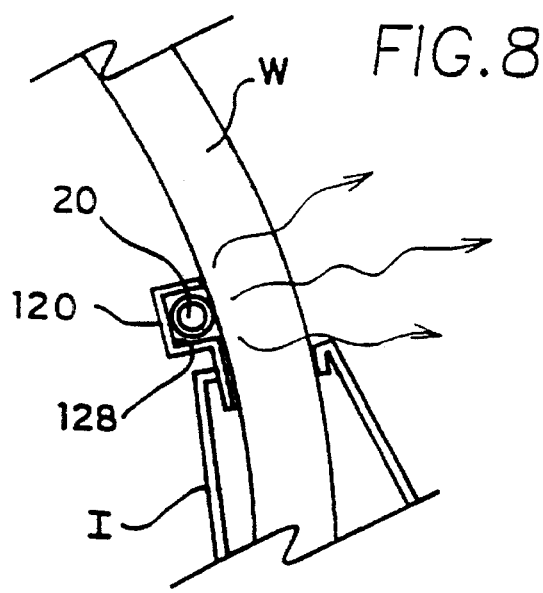
FIG. 8 is a side elevation of a mounting device for use in mounting the optical fiber cable about the periphery of the motor vehicle window.
Figure 9:
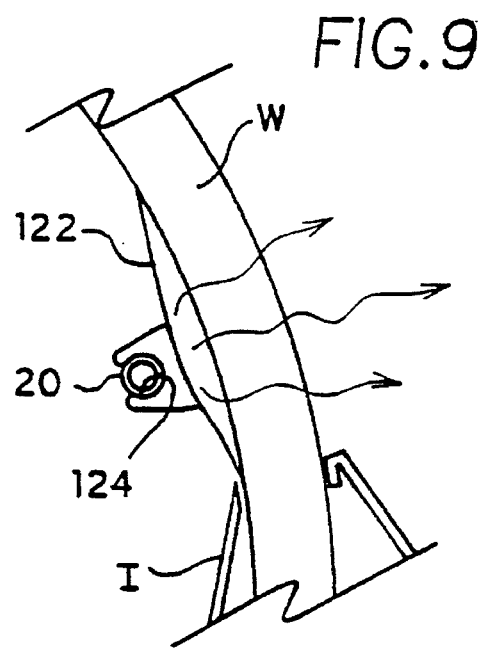
FIG. 9 is a side elevation an alternative mounting device for use in mounting the optical fiber cable about the periphery of the motor vehicle window.
Figure 10:
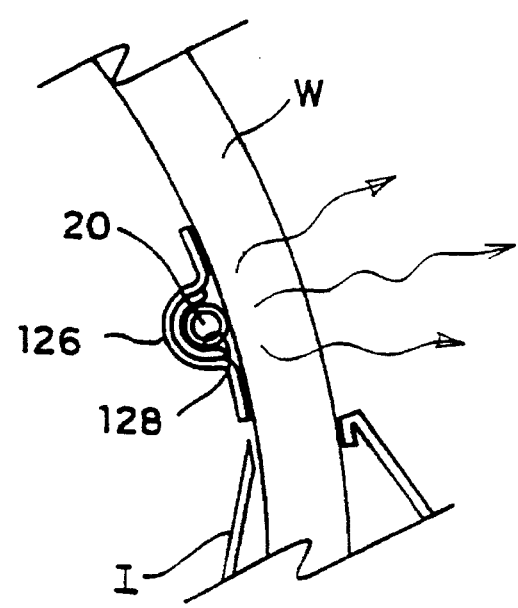
FIG. 10 is a side elevation of another alternative mounting device for use in mounting the optical fiber cable about the periphery of the motor vehicle window.

Referring now to FIG. 8, the fiber optical cable 20 is shown mounted to the motor vehicle rear window through the use of a metal channel 120 supported between the motor vehicle rear window W and the motor vehicle rear window interior trim I. Alternatively, suction cups 122 having a channel 124 for receiving the optical fiber cable 20 therein may secure the optical fiber cable 20, as is shown in FIG. 9. As another alternative, an adhesive tape material 126 may be used, as is shown in FIG. 10. Regardless of the mounting device used to install the optical fiber cable 20, it is preferred that light being emitted from the optical fiber cable 20 be visible only from without the motor vehicle M so as to not distract the motor vehicle operator. The mounting device could also possess a reflective surface 128 for reflecting light emitted from the optical fiber cable 20 exteriorly of the motor vehicle M.

Figure 11:
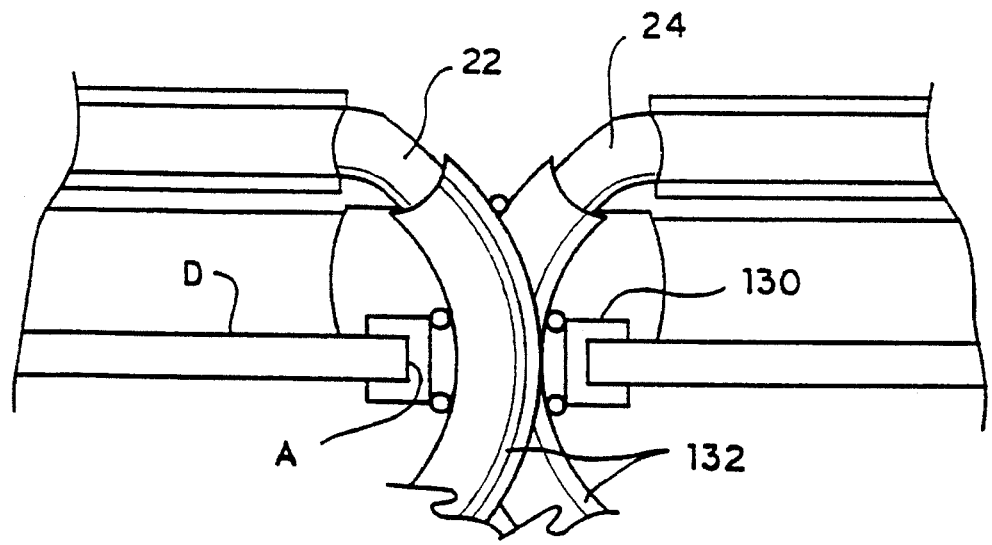
FIG. 11 is a side elevation of the optical fiber cable being routed into the motor vehicle trunk through the motor vehicle packaging shelf, the motor vehicle packaging shelf is shown in cross-section.

The fiber optical cable ends 22, 24 are routed to the motor vehicle trunk T through one or more apertures A provided in the motor vehicle package shelf or rear dash board D, as is shown in FIG. 11. A grommet 130 would protect the optical fiber cable 20 from being chafed by the motor vehicle rear dash board D. Wrapping the optical fiber cable ends 22, 24, such as with the heat shrink tubing 132 shown, would prevent light from escaping from the optical fiber cable ends 22, 24.

The light source box 30 is mounted in a suitable location in the motor vehicle trunk T as is shown in FIG. 1 and 7A. The light source box 30 is preferably mounted through the use of the threaded fasteners 134 as are shown in FIG. 2. The optical fiber ends 22, 24 are routed into the light source box 30 through connectors 50, 52. Source wiring 54 supplies power to the halogen lights 36, 38, the ventilation fan 40, and the relay 48. The source wiring 54 is fed into the light source box 30 through a third connector 56. Each of the connectors 50, 52, 56 may secure the optical fiber cable ends 22, 24 and the wiring 54 to the light source box 30 while at the same time, reducing the risk of chafing to the same.

Figure 12:
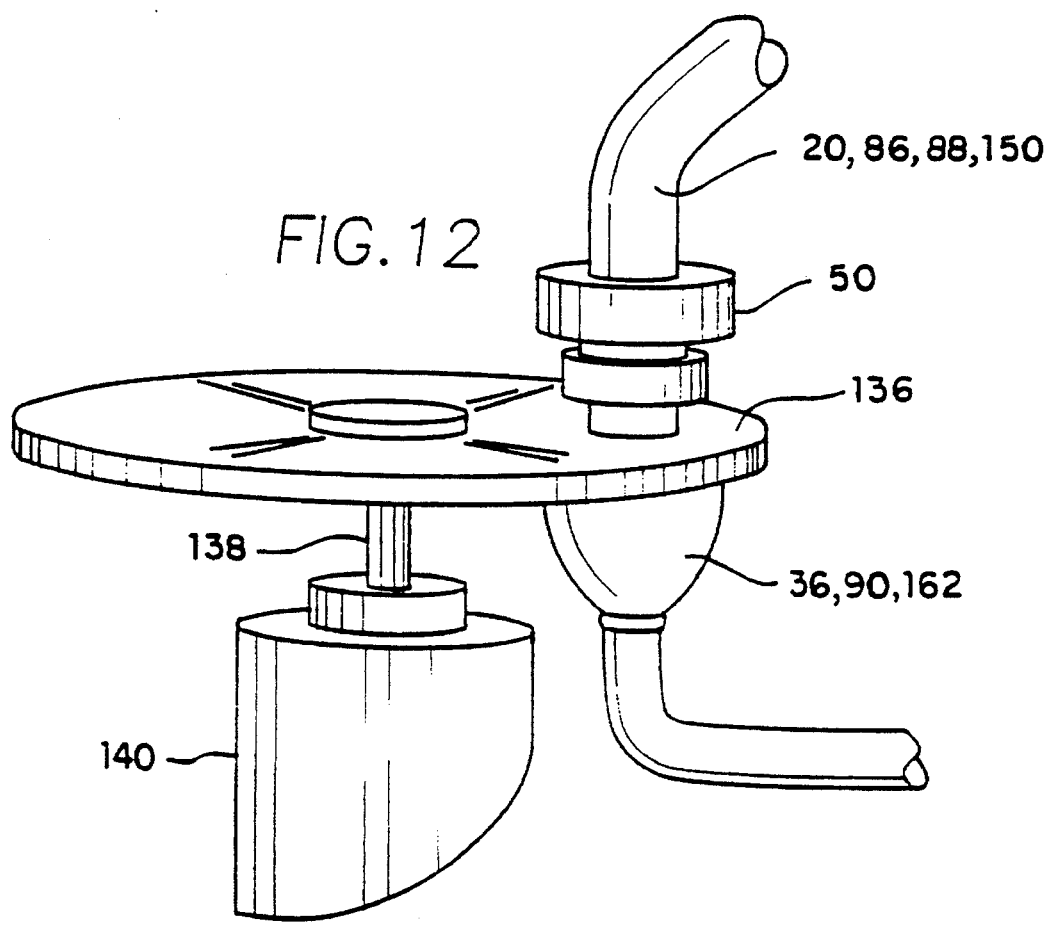
FIG. 12 is a diagrammatic representation of a multi-colored disk lens driven by a step motor.

Referring to FIG. 12, it should be understood that a multi-colored lens disk 136 may be substituted in any one of the aforementioned embodiments for the first lens 32,110. The multi-colored lens disk 136 is shown to include an axle 138 driven by a step motor 140. The step motor 140 and the multi-colored lens disks 136 are both contained in the light source box 30. The step motor 140 is electrically powered and may be actuated to rotate the multi-colored lens disk 136 over a predetermined angular distance to select a desired color of light to be emitted by the optical fiber cable 20, 86, 88, 150 or may be driven continuously to continually change the light color. The step motor may be controlled independently by a separate toggle switch or may be controlled by the toggle switch 58, 108 controlling the various aforementioned circuits.

The first lens 32,110 of each embodiment is preferably of any color other than red. Red is the preferred color of the second lens 34, 114 which corresponds to the color of the motor vehicle brake light lens L, as is shown in FIGS. 1 and 7. The lenses 34, 36, 110, 114, 136 are preferably dichroic color lenses approved by state authorities and the Department of Transportation (DOT).

Figure 17:
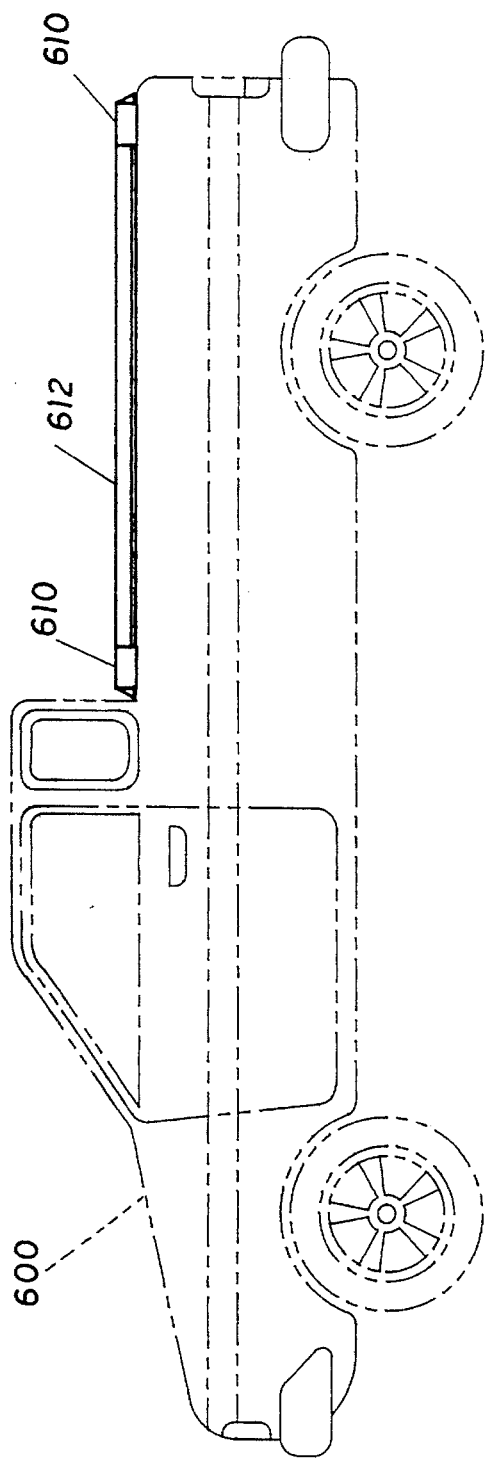
FIG. 17 is a left-side elevational view showing an embodiment of the invention installed along the bed of a pickup truck.
Figure 18:
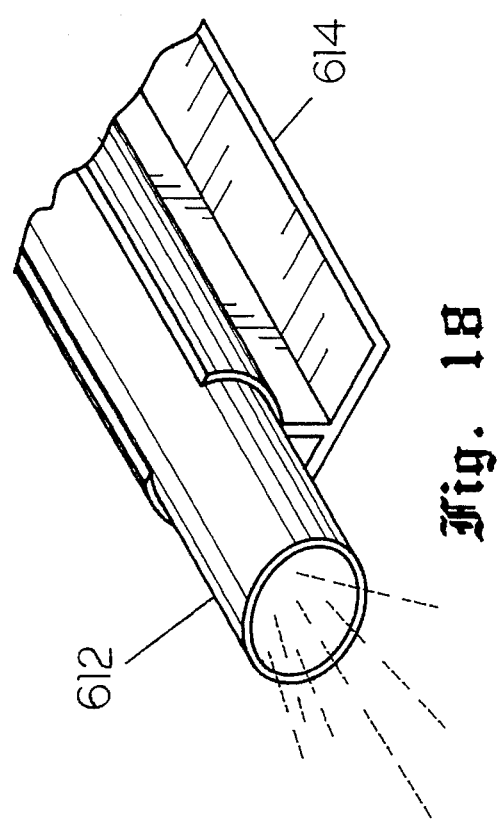
FIG. 18 is a magnified perspective view of the embodiment shown in FIG. 17, showing a detailed view of the means for mounting the fiber optic cable to a motor vehicle.

A sixth embodiment of the present invention, depicted in FIGS. 17 and 18, utilizes ultraviolet (UV)-protected sidelight fiber optic cables 612, mounted within UV-protected clear or colored optically transmissive holders 614 which are mounted along the top of the side body panels of a truck 600. Separate light source boxes 610 are mounted at each end of the fiber optic cable 612, and operationally connected thereto. A separate sidelight fiber optic cable 612, connected to two light source boxes 610, is mounted to the left and right sides of the truck bed. Preferably, one of the light source boxes 610 attached to each fiber optic cables 612 emits a red light into the fiber optic cable, while the other light source box emits an amber or yellow light into the fiber optic cable.

The holder 614 includes a base portion which contacts the motor vehicle, and a longitudinal arcuate race which frictionally engages the fiber optic cable 612. The holder 614 can be made from any suitably rigid and optically transmissive material. Poly (methylmethacrylate) (sold under various trademarks such as PLEXIGLASS and LUCITE) is preferred.

As shown in FIG. 17, the sidelight optical fiber 612 is mounted to the top of the side panels of a truck. It is also envisioned that the present invention may be mounted along any portion of a motor vehicle so as to maximize both the safety aspects of the present invention, as well as the decorative appearance of the motor vehicle to which the invention is attached. Illustratively, the present invention may be mounted vertically along the rear portion of a semi-tractor trailer, or mounted along the periphery of a flat-bed truck. These examples are for illustration only, and are not meant to be limiting in any fashion.

In the same fashion as the other embodiments discussed above, the left side light source boxes operationally interact with the vehicle left park, brake and directional signal light circuits, while the right side light sources function in an identical fashion, but operationally linked with the right park, brake and directional signal light circuits.

A seventh embodiment of the present invention, shown in FIGS. 19 and 20, operates in an identical fashion to the sixth embodiment, described immediately above. Here, however, the fiber optic cables 612 are mounted within a hollow extrusion 616 having axial slots formed therein. The extrusion 616 is preferably made of metal, preferably aluminum, but any suitably rigid material (e.g. synthetic plastics and the like) will function with equal success. If an optically transmissive material is used to form the hollow extrusion 616, the axial slots may be omitted. As shown in FIG. 20, the extrusion 616 is of roughly square cross-section, although the shape of the extrusion is not critical. The light sources boxes 610 are operationally connected in the same fashion as discussed above, and are preferably arranged so that one light source box 610 connected to each fiber optic cable 612 is red, and the other light source box is yellow or amber.

The axial slots formed within the extrusion 616 allow the illuminated fiber optic cable 612 to be clearly visible, while the body of the extrusion protects the fiber optic cable from physical contact, as when the truck is being loaded or unloaded.

As noted in the above embodiments, the colors of the two light sources for each fiber optic illumination assembly are preferably red and yellow, although any combination of colors can be used. Such color may be formed in any conventional manner, such as by using colored bulbs, or by using a combination of broad-spectrum light sources and colored lenses.

FIGS. 13 through 16 show circuit schematics illustrating various way the six and seventh embodiments of the present invention can be operationally linked to the parking light, brake light, and direction signal light circuits of a motor vehicle.

Figure 13:
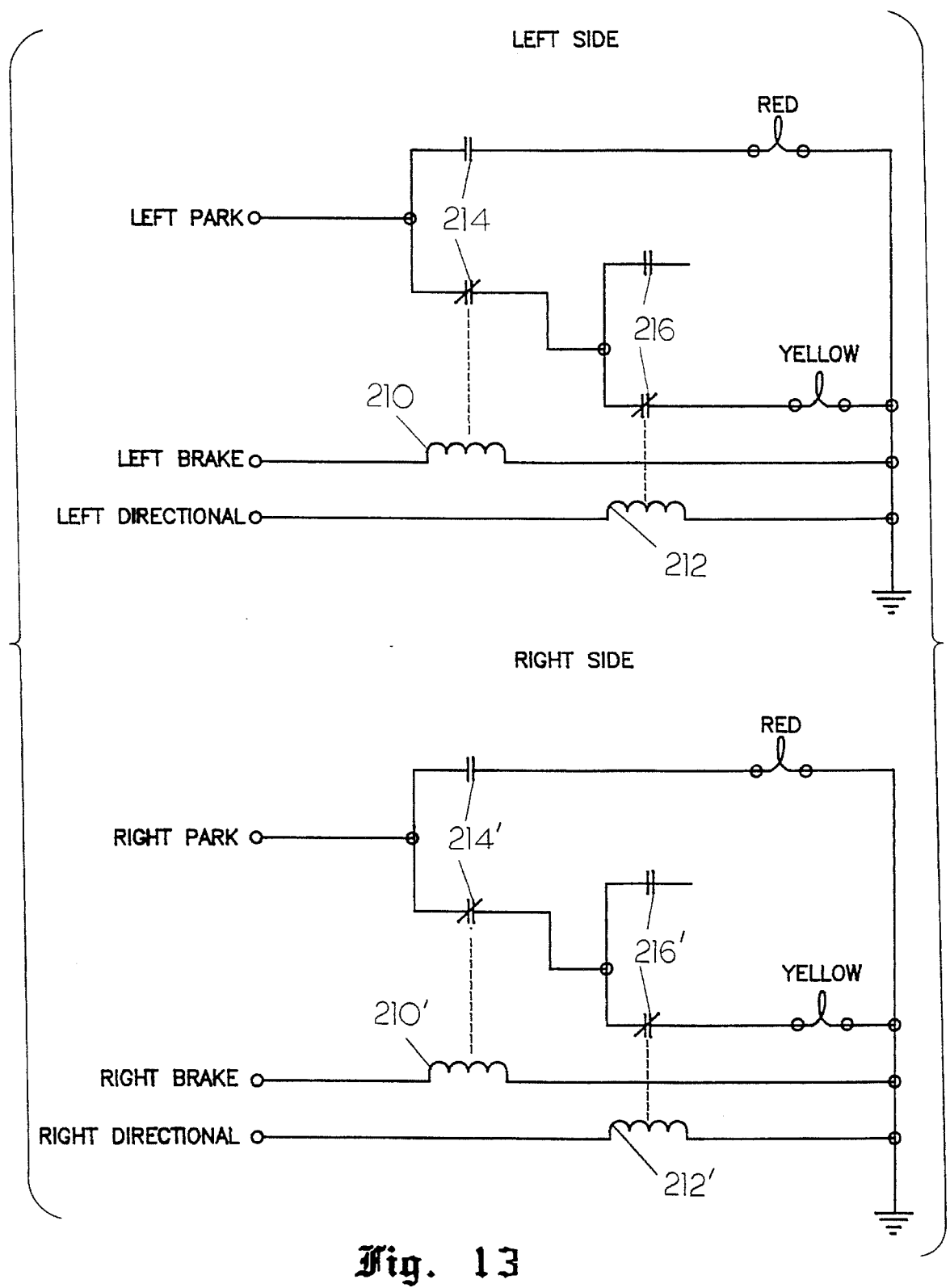
FIG. 13 is a schematic representation of a circuit configuration to control operation of the present invention in cooperation with the parking light, brake light, and directional signal light circuits of a motor vehicle.

FIG. 13 shows a circuit in which the right and left side lighting circuits of the motor vehicle are linked to the present invention via relays 210', 212', and 210, 212 respectively. As noted above, one of the light source boxes attached to each fiber optic cable preferably emits a red light, and the other light source box emits a yellow light. Using the circuit shown in FIG. 13, only one of the light source boxes per fiber optic cable will be activated at any given moment.

In operation, the circuit shown in FIG. 13 will illuminate both fiber optic cables with yellow light when the vehicle parking lights are energized (via switches 214 and 214'). The yellow illuminated cables will then flash alternately with the directional signal light of that side (switches 216 and 216') unless, or until the brake light circuit is activated, which will illuminate both the right and left fiber optic cables with red light (relay 210 and 210').

Figure 14:
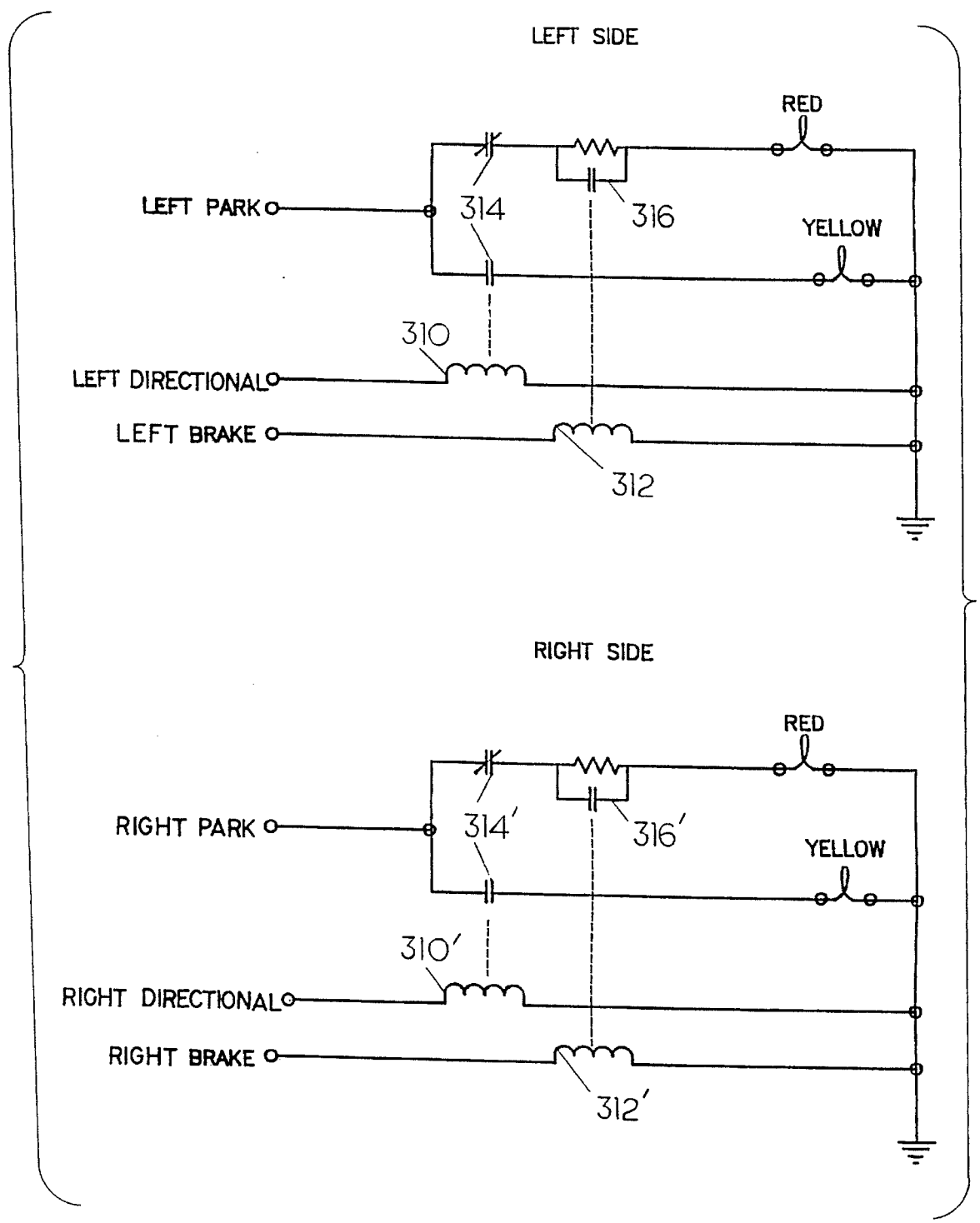
FIG. 14 is a schematic representation of a circuit configuration to control operation of the present invention in cooperation with the parking light, brake light, and directional signal light circuits of a motor vehicle.

FIG. 14 illustrates another circuit in which both fiber optic cables will be illuminated with a faint red light when only the parking lights are activated (switches 314 and 314'), and a far brighter "brake light" red when the brake light circuit is activated (relays 312 and 312' in cooperation with sub-circuit 316 and 316'). When the fiber optic cables are illuminated with either faint red, or brake light red, and either of the directional signal light circuits is activated, the corresponding fiber optic cable will flash with yellow light intermittently with red light (relays 310 and 310').

Figure 15:
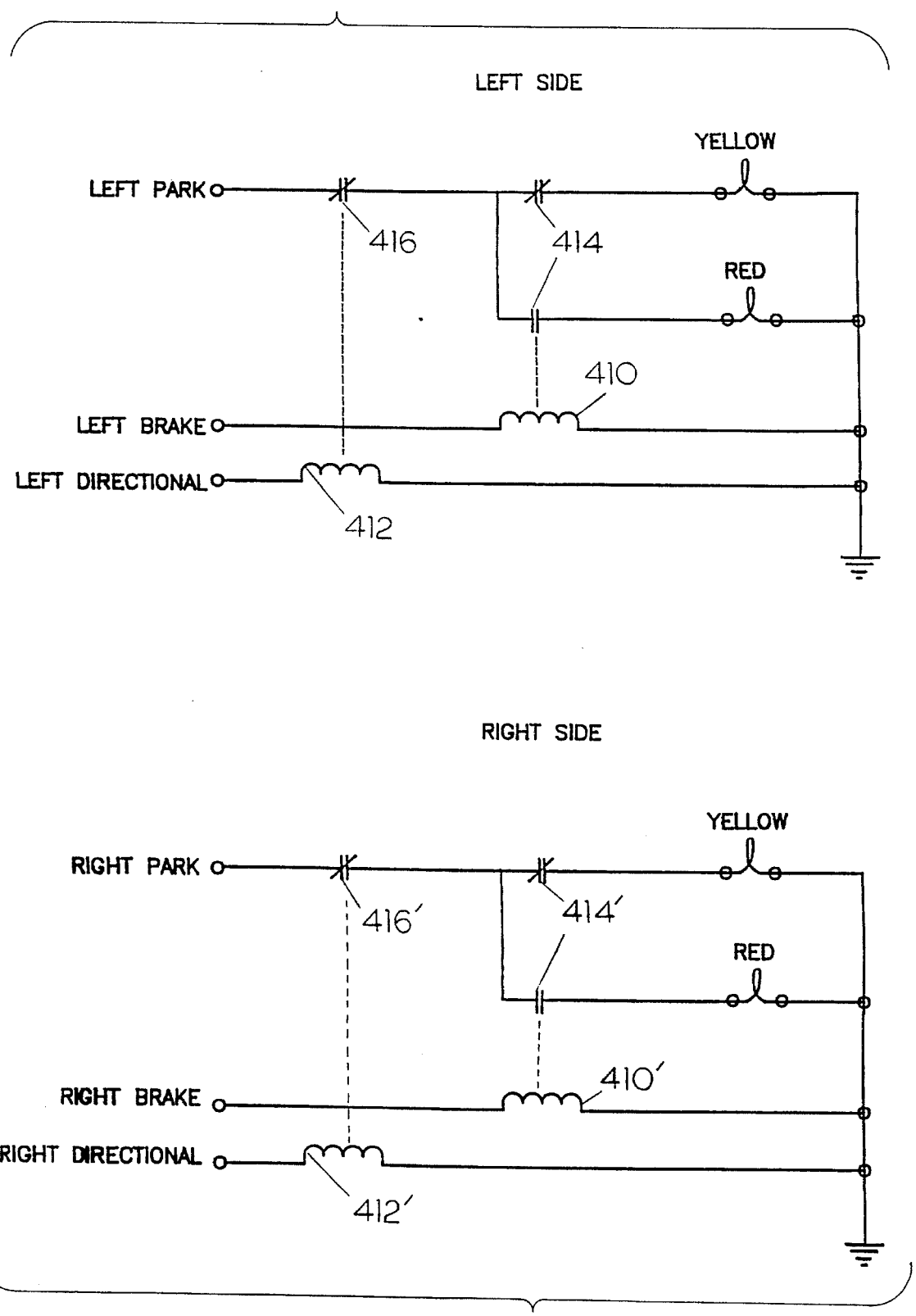
FIG. 15 is a schematic representation of a circuit configuration to control operation of the present invention in cooperation with the parking light, brake light, and directional signal light circuits of a motor vehicle.

FIG. 15 shows a circuit in which the fiber optic cables are illuminated with a yellow light when the parking light circuit is activated (N/C switches 416 and 416'), and a red light when the brake light circuit is activated (switches 414 and 414' and relays 410 and 410'). Activation of the directional signal circuit causes either the yellow (parking) or red (brake) light to flash coincident with the directional signal light of the corresponding side of the motor vehicle (relays 412 and 412').

Figure 16:
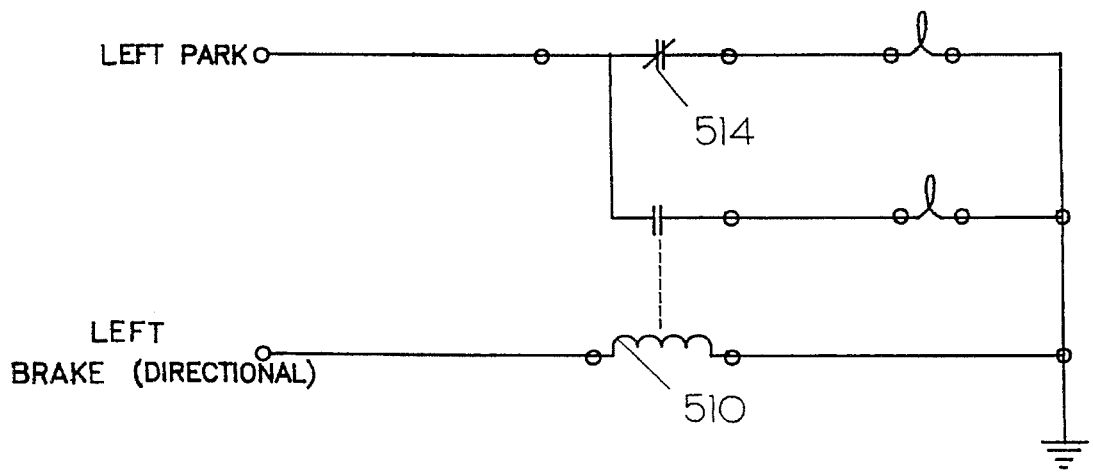
FIG. 16 is a schematic representation of a circuit configuration to control operation of the present invention in cooperation with the parking light, and combination brake light and directional signal light circuits of a motor vehicle.
Figure 16:
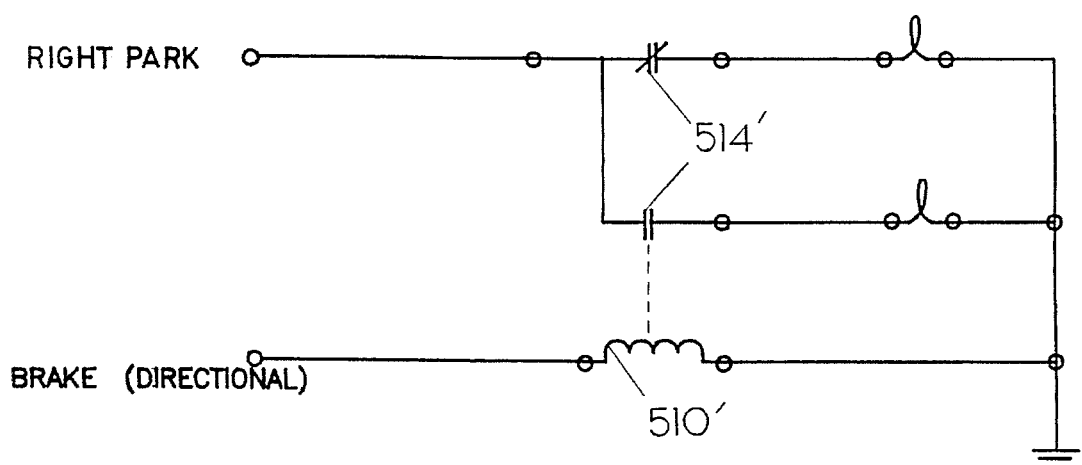

FIG. 16 shows a circuit for use in a motor vehicle which lacks separate amber-colored turn signal lights. In this type of vehicle, the brake lights double as directional signal lights, and flash on the corresponding side when the directional signals are activated. Here, the circuit illuminates both fiber optic cables with yellow light until the brake circuit is activated, which causes the fiber optic cables to be illuminated with red light. Activation of the directional signal circuit will cause the fiber optic cable on the corresponding side of the vehicle to flash yellow light and then red light.

The sidelight fiber optic cables can be installed along any external surface of the bed of a truck or body of a vehicle, including along the bed or tailgate of a truck. As shown illustratively in FIGS. 17, and 19, the sidelight fiber optic cable is installed along the top edge of the bed of a pickup truck.

It is to be understood that the present invention is not limited to the embodiments described above, but encompasses any and all embodiments within the scope of the following claims.

I claim:

1. An optical fiber illumination device comprising: at least one illumination assembly, said illumination assembly including:
    at least one side-light optical fiber cable, said side-light optical fiber cable having a first input located at a first end thereof and a second input located at a second end thereof;
    a first light source arranged adjacent to said first input, said first light source energized by a first electric circuit;
    a second light source arranged adjacent to said second input, said second light source energized by a second electric circuit;
    a first light source box surrounding said first input of said at least one side-light optical fiber cable and said first light source;
    a second light source box surrounding said second input of said at least one side-light optical fiber cable and said second light source; and
    optically transmissive means for mounting said at least one side-light optical fiber cable to a motor vehicle, said means for mounting including a base portion and a longitudinal arcuate race dimensioned and configured to frictionally interengage said at least one side-light optical fiber cable.

2. The optical fiber illumination device according to claim 1, wherein said optically transmissive means for mounting is mounted about an upper edge of a truck bed of a motor vehicle.

3. The optical fiber illumination device according to claim 1, further comprising a first lens interposed between said first light source and said first input;
    a second lens interposed between said second light source and second input, said second lens possessing a filtering characteristic distinguishable from a distinguishing characteristic of said first lens; and
    a first control means for disabling said first light source, said first control means being responsive to said second electric circuit.

4. The optical fiber illumination device according to claim 3, wherein said first electric circuit is a parking light circuit of a motor vehicle; and
    said first light source is energized when the parking light circuit of the motor vehicle is activated.

5. The optical fiber illumination device according to claim 4, wherein said second electric circuit is a brake light circuit of a motor vehicle; and
    said second light source is energized when the brake light circuit of the motor vehicle is activated, and said first control means disables said first light source when the brake light circuit of the motor vehicle is activated.

6. The optical fiber illumination device according to claim 5, further comprising a second control means for disabling said first light source, there further being a third electric circuit, said second control means being responsive to said third electric circuit.

7. The optical fiber illumination device according to claim 6, wherein said third electric circuit is a directional signal circuit of a motor vehicle; and said second control means disables said first light source when the directional signal circuit of the motor vehicle is activated;
    whereby said first light source is disabled when a directional signal light of the motor vehicle is activated, and said first light source is not disabled when a directional signal light of the motor vehicle is deactivated.

8. The optical fiber illumination device according to claim 7, further comprising a second illumination assembly identical to said at least one illumination assembly, and
    wherein the directional signal circuit of the motor vehicle has a right-turn-indicating means and a left-turn-indicating means, said at least one illumination assembly being responsive to the right-turn indicating means, and said second illumination assembly being responsive to the left-turn-indicating means.

9. The optical fiber illumination device according to claim 8, wherein said first and second light sources are halogen lamps.

10. The optical fiber illumination device according to claim 8, wherein said first and second lenses are dichroic lenses.

11. An optical fiber illumination device comprising:
    at least one illumination assembly, said assembly including:
    at least one side-light optical fiber cable, said side-light optical fiber cable having a first input located at a first end thereof and a second input located at a second end thereof;
    a first light source arranged adjacent to said first input, said first light source energized by a first electric circuit;
    a second light source arranged adjacent to said second input, said second light source energized by a second electric circuit;

a first light source box surrounding said first input of said at least one side-light optical fiber cable and said first light source;

a second light source box surrounding said second input of said at least one side-light optical fiber cable and said second light source; and means for mounting said at least one side-light optical fiber cable to a motor vehicle, said means for mounting including a hollow elongated member, said hollow elongated member selected from the group consisting of optically transmissive hollow elongated members, optically transmissive hollow elongated members including at least one axial slot passing therethrough, and non-optically transmissive hollow elongated members including at least one axial slot passing therethrough, said at least one optical fiber cable disposed within said hollow elongated member.

12. The optical fiber illumination device according to claim 11, wherein said optically transmissive means for mounting is mounted about an upper edge of a truck bed of a motor vehicle.

13. The optical fiber illumination device according to claim 11, further comprising a first lens interposed between said first light source and said first input;

a second lens interposed between said second light source and second input, said second lens possessing a filtering characteristic distinguishable from a distinguishing characteristic of said first lens; and a first control means for disabling said first light source, said first control means being responsive to said second electric circuit.

14. The optical fiber illumination device according to claim 13, wherein said first electric circuit is a parking light circuit of a motor vehicle; and said first light source is energized when the parking light circuit of the motor vehicle is activated.

15. The optical fiber illumination device according to claim 14, wherein said second electric circuit is a brake light circuit of a motor vehicle; and said second light source is energized when the brake light circuit of the motor vehicle is activated, and said first control means disables said first light source when the brake light circuit of the motor vehicle is activated.

16. The optical fiber illumination device according to claim 15, further comprising a second control means for disabling said first light source, there further being a third electric circuit, said second control means being responsive to said third electric circuit.

17. The optical fiber illumination device according to claim 16, wherein said third electric circuit is a directional signal circuit of a motor vehicle; and said second control means disables said first light source when the directional signal circuit of the motor vehicle is activated;

whereby said first light source is disabled when a directional signal light of the motor vehicle is activated, and said first light source is not disabled when a directional signal light of the motor vehicle is deactivated.

18. The optical fiber illumination device according to claim 17, further comprising a second illumination assembly identical to said at least one illumination assembly, and wherein the directional signal circuit of the motor vehicle has a right-turn-indicating means and a left-turn-indicating means, said at least one illumination assembly being responsive to the right-turn indicating means, and said second illumination assembly being responsive to the left-turn-indicating means.

19. The optical fiber illumination device according to claim 18, wherein said first and second light sources are halogen lamps.

20. The optical fiber illumination device according to claim 18, wherein said first and second lenses are dichroic lenses.

* * * * *